US012440760B2

(12) United States Patent
Shimamoto et al.

(10) Patent No.: US 12,440,760 B2
(45) Date of Patent: Oct. 14, 2025

(54) NON-TRANSITORY COMPUTER-READABLE STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Makoto Shimamoto, Tokyo (JP); Reina Nakamura, Tokyo (JP); Yumi Otsuka, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 348 days.

(21) Appl. No.: 18/154,239

(22) Filed: Jan. 13, 2023

(65) Prior Publication Data

US 2023/0330538 A1 Oct. 19, 2023

(30) Foreign Application Priority Data

Apr. 13, 2022 (JP) ................................ 2022-066405

(51) Int. Cl.
*A63F 13/537* (2014.01)
*A63F 13/533* (2014.01)

(52) U.S. Cl.
CPC .......... *A63F 13/537* (2014.09); *A63F 13/533* (2014.09)

(58) Field of Classification Search
CPC ............................ A63F 13/537; A63F 13/533
See application file for complete search history.

(56) References Cited

U.S. PATENT DOCUMENTS 4,877,255 A * 10/1989 von Braunhut ........... A63F 1/04 273/299
6,612,926 B1 * 9/2003 Dabrowski ......... G07F 17/3227 463/16
2003/0013509 A1 * 1/2003 Efremov ................ A47B 25/00 463/13
2004/0053657 A1 * 3/2004 Fiden ...................... G07F 17/32 463/16

(Continued)

FOREIGN PATENT DOCUMENTS

JP 2014219867 A 11/2014
WO 2014141314 A1 9/2014

OTHER PUBLICATIONS

AL82 Retrogaming Longplays, Turbo OutRun Longplay (Arcade), Dec. 24, 2020, Youtube.com, pp. 1-9, at https://www.youtube.com/watch?v=kSsYwGCC65w (last visited Feb. 19, 2025) (Year: 2020).*

(Continued)

*Primary Examiner* — Steve Rowland
(74) *Attorney, Agent, or Firm* — Scully, Scott, Murphy & Presser, P.C.

(57) ABSTRACT

An exemplary information processing apparatus determines whether or not first operation is performed on the operating device, based on the operation data; displays a UI image in a first situation, and repeats display of a first gauge extending to the first length while the first operation is not performed in the first situation. Further, when the first operation is continuously performed in the first situation, a second gauge extending is displayed, and when the second gauge reaches the second length, first processing associated with the operation is performed.

32 Claims, 13 Drawing Sheets

(56) References Cited

U.S. PATENT DOCUMENTS

| | | | | |
|---|---|---|---|---|
| 2005/0253337 | A1* | 11/2005 | Whiting | A63F 3/00157 273/292 |
| 2005/0269776 | A1* | 12/2005 | Miller | A63F 3/00157 273/274 |
| 2008/0217857 | A1* | 9/2008 | Miller | A63F 3/00157 463/12 |
| 2014/0333964 | A1 | 11/2014 | Ueda et al. | |
| 2019/0201790 | A1* | 7/2019 | Takahashi | A63F 13/812 |
| 2021/0001226 | A1* | 1/2021 | Suzuki | A63F 13/816 |
| 2024/0020968 | A1* | 1/2024 | Haskin | G06F 16/29 |
| 2024/0365239 | A1* | 10/2024 | Li | H04W 52/0216 |

OTHER PUBLICATIONS

"TETRIS 99", [online], Dec. 11, 2019, Nintendo Co., Ltd., [searched on Apr. 11, 2022], internet <URL:https://topics.nintendo.co.jp/article/d02bc22f-1496-11ea-b641-063b7ac45a6d>.

Notice of Reasons for Refusal dated Oct. 4, 2023 received in Japanese Patent Application No. JP 2022-066405.

Lost Judgment: The memory which is not judged Perfect Report, first edition, Kadokawa Corporation, Oct. 29, 2021, p. 103, ISBN978-4-04-733571-4.

New Danganronpa V3 Colossiai School Guide V3, Dengeki PlayStation 1/12 Issue vol. 629 Special Appendix 1, Kadokawa Corporation, Dec. 22, 2016, p. 15, column "Theoretical Armaments".

* cited by examiner

NON-TRANSITORY COMPUTER-READABLE STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2022-066405 filed on Apr. 13, 2022, the entire contents of which are incorporated herein by reference.

FIELD

This exemplary embodiment relates to a non-transitory computer-readable storage medium storing an information processing program that prompts a user to perform operation, an information processing apparatus, an information processing system, and an information processing method.

BACKGROUND AND SUMMARY

For example, there has been performed display of a gauge that extends while a button is continuously pressed. For example, in a game, press-holding a button on a team-selecting screen or the like displays a gauge extending around an icon indicating the button, and releasing the button causes the gauges to revert. Further, continuing the press-hold until the gauge circles the button icon cancels participation and returns to the main menu.

Such a way of the display left room for improvement because it could be difficult to know whether the button only needs to be pressed once or needs to be continuously pressed, until the button is actually pressed.

Therefore, an object of this exemplary embodiment is to provide a user interface that is clear for a user in a situation where the user is assumed to perform a continuous operation.

To achieve the above-described object, this exemplary embodiment adopts a configuration as described below.

(First Configuration)

An information processing program of a first configuration causes a processor to: obtain operation data from an operating device; determine whether or not first operation is performed on the operating device, based on the operation data; display an image including a predetermined UI image on a display device, in a first situation of information processing; repeat display of a first gauge extending to a first length with elapse of time in a part of the UI image, while the first operation is not performed in the first situation; display a second gauge extending with elapse of time in a part of the UI image, while the first operation is continuously performed in the first situation; and perform first processing corresponding to the first operation, when the first operation is continued until the second gauge reaches a second length.

According to the above configuration, display of the first gauge extending to the first length with elapse of time is repeated while the first operation is not performed. Therefore, it is possible to clearly indicate to the user continuation of the first operation, thus allowing improvement in usability.

(Second Configuration)

A second configuration may be the first configuration adapted so that the first length is shorter than the second length.

According to the above configuration, display of the first gauge extending to the first length that is shorter than the second length is repeated while the first operation is not performed. Therefore, it is possible to indicate to the user that the first operation is not performed and prompt the user to perform the first operation.

(Third Configuration)

A third configuration may be the above-described first or second configuration adapted so that the first gauge and the second gauge are displayed in a same position of the UI image, and are gauges having different colors, respectively, or gauges having a same color.

According to the configuration, it is possible to clearly prompt the first operation by displaying the first gauge and the second gauge in the same position, and by, for example, differentiating the color, the user is easily able to recognize whether or not the first operation is performed.

(Fourth Configuration)

A fourth configuration may be any of the above first to third configurations adapted so that the first gauge and the second gauge are each an image constituting at least a part of a circle arranged around a circular icon that is a part of the UI image.

According to the above configuration, the icon and the gauge can be more highly integrated, thus allowing the user to easily recognize that the icon and the gauge correspond to each other.

(Fifth Configuration)

A fifth configuration may be the fourth configuration adapted so that the first operation is operation of pressing a predetermined key provided in the operating device. The circular icon may be a key icon indicating a type of the key.

According to the above configuration, the icon and the key to be operated can be associated with each other, which makes it easier for the user to understand the operation to be performed.

(Sixth Configuration)

A sixth configuration may be any of the above first to third configurations adapted so as to cause the processor to display, in the first situation, a plurality of item icons related to a plurality of items and a cursor that indicates a selected item out of the plurality of items, the first situation being a situation of selecting any of the plurality of items. The configuration may further cause the processor to control the cursor to change the selected item icon, based on the second operation on the operating device; display the first gauge and the second gauge around the selected item icon; and perform processing associated with the selected item as the first processing.

According to the above configuration, the first gauge and the second gauge can be displayed in association with the selected item icon in a situation where a plurality of item icons are displayed and any of the plurality of item icons is to be selected by using the cursor.

(Seventh Configuration)

A seventh configuration may be any of the above first to fourth, and sixth configurations adapted so that the first operation is operation of pressing a predetermined key provided in the operating device; and the UI image includes a key icon indicating a type of the key.

According to the above configuration, the icon and the key to be operated can be associated with each other, which makes it easier for the user to understand the operation to be performed.

(Eighth Configuration)

An eighth configuration may be any of the above first to seventh configurations adapted so that a speed at which the first gauge extends is slower than a speed at which the second gauge extends.

According to the above configuration, it is possible to prompt the user to perform the first operation if the first operation is not performed, and the first processing can be performed relatively swiftly if the first operation is performed.

Further, another exemplary embodiment may be an information processing apparatus or an information processing system which executes the above-described information processing program. Further, another exemplary embodiment may be an information processing method.

According to this exemplary embodiment, it is possible to clearly indicate to the user continuation of the first operation, thus allowing improvement in usability.

These and other objects, features, aspects and advantages will become more apparent from the following detailed description when taken in conjunction with the accompanying drawings.

DETAILED DESCRIPTION OF NON-LIMITING EXAMPLE EMBODIMENTS (System Configuration)

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment is described, and then, the control of the game system 1 according to the exemplary embodiment is described.

Figure 1:
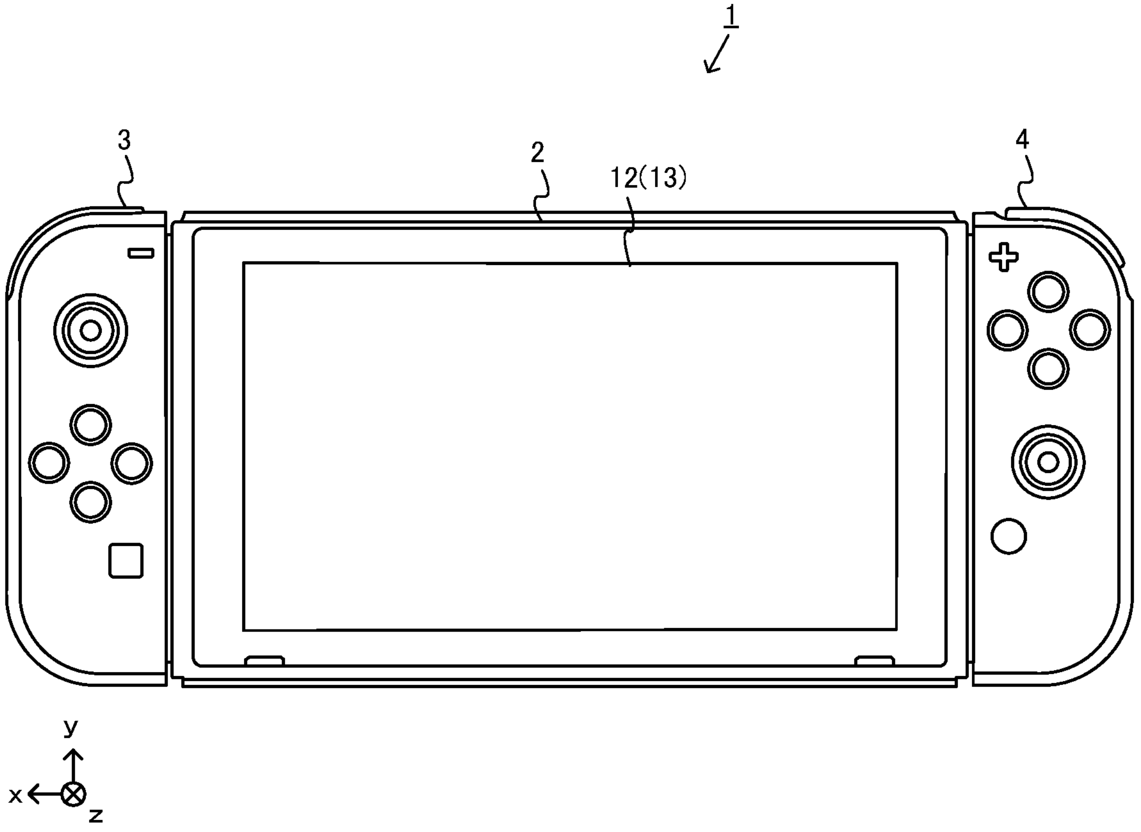
FIG. 1 is an example non-limiting diagram showing an exemplary state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

The left controller 3 and the right controller 4 are attachable to and detachable from the main body apparatus 2. It should be noted that hereinafter, the left controller 3 and the right controller 4 will occasionally be referred to collectively as a "controller".

The main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus. The main body apparatus 2 or the unified apparatus may function as a portable apparatus.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

Figure 2:
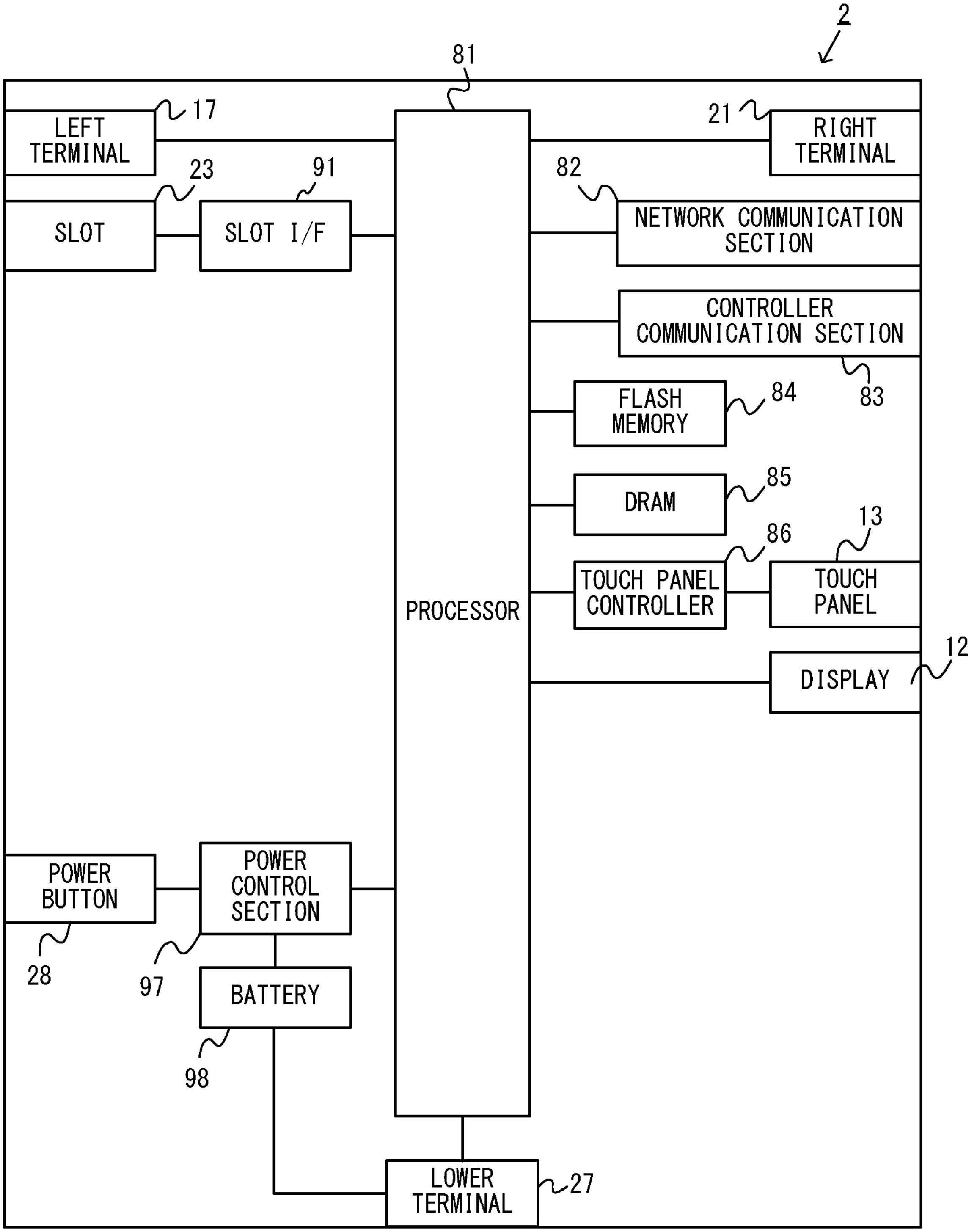
FIG. 2 is an example non-limiting block diagram showing an exemplary internal configuration of the main body apparatus 2.

FIG. 2 is a block diagram showing an example of the internal configuration of the main body apparatus 2.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of an SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication).

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 3:
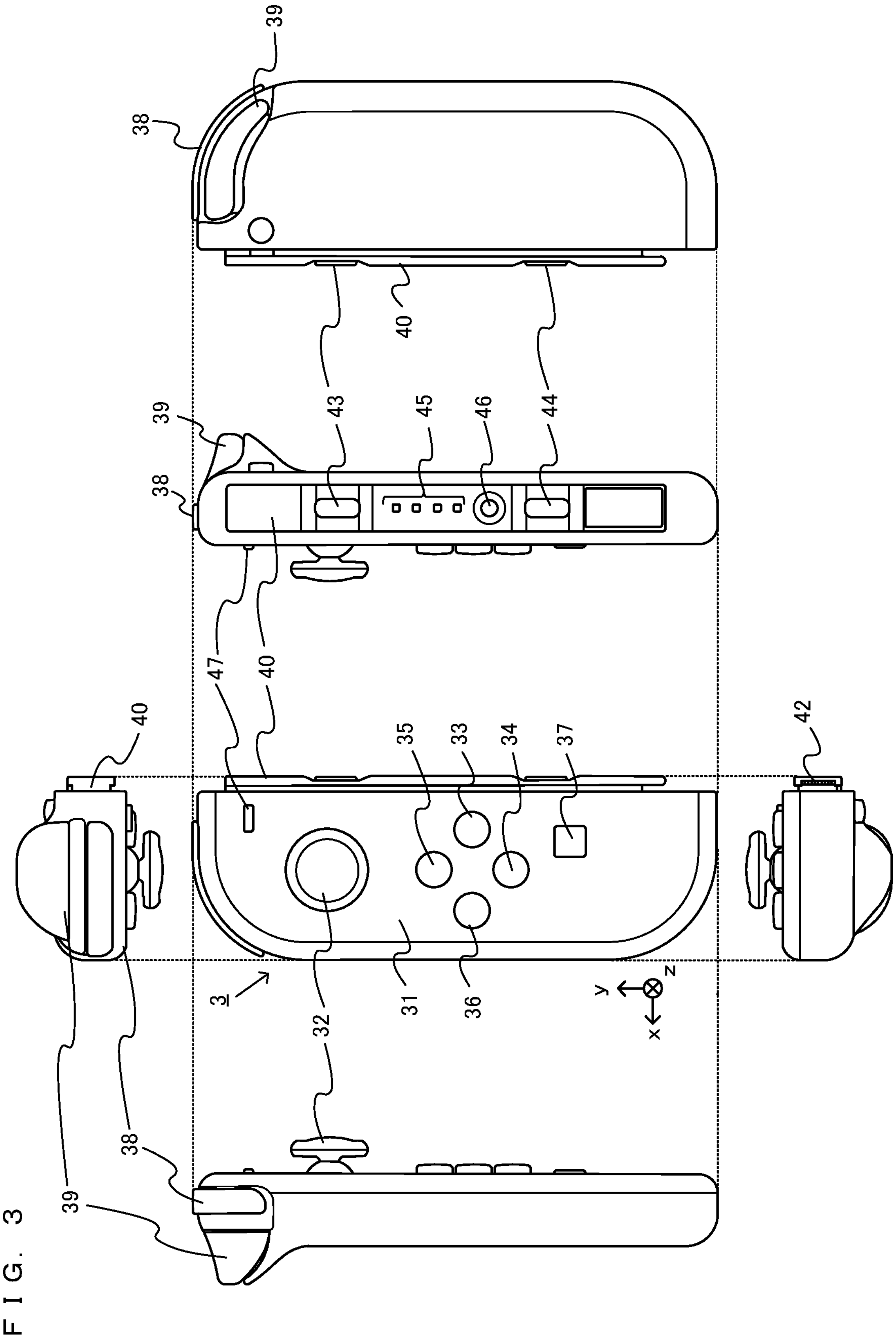
FIG. 3 is an example non-limiting six-sided view showing the left controller 3.

FIG. 3 is six orthogonal views showing an example of the left controller 3. In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 3, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 4:
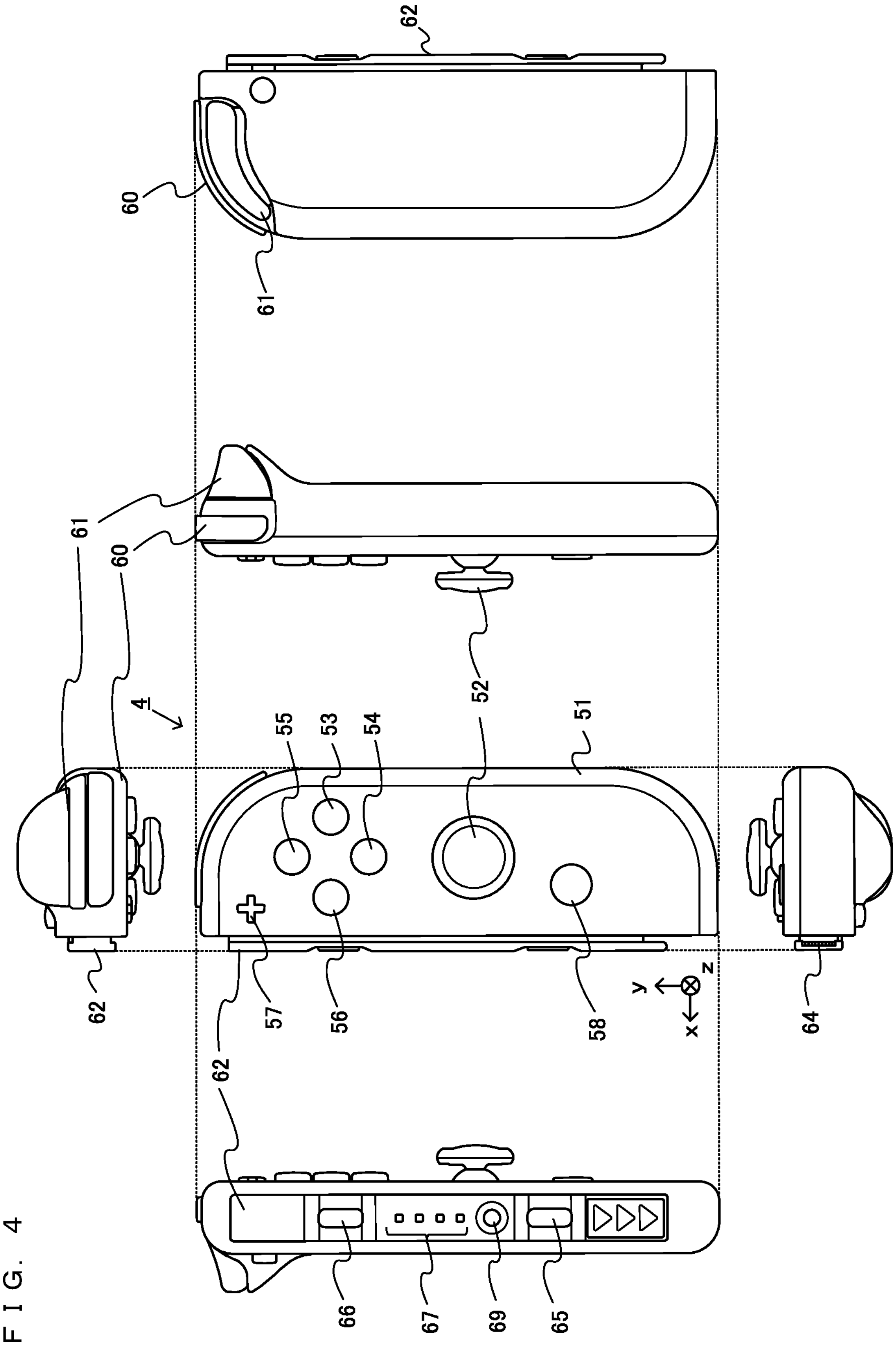
FIG. 4 is an example non-limiting six-sided view showing the right controller 4.

FIG. 4 is six orthogonal views showing an example of the right controller 4. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

(Overview of User Interface of Present Exemplary Embodiment)

The following describes a user interface of this exemplary embodiment. This exemplary embodiment uses a user interface (UI) in a specific situation of a game. Note that the user interface of this exemplary embodiment is not limited to games and may be used in any given information processing.

Figure 5:
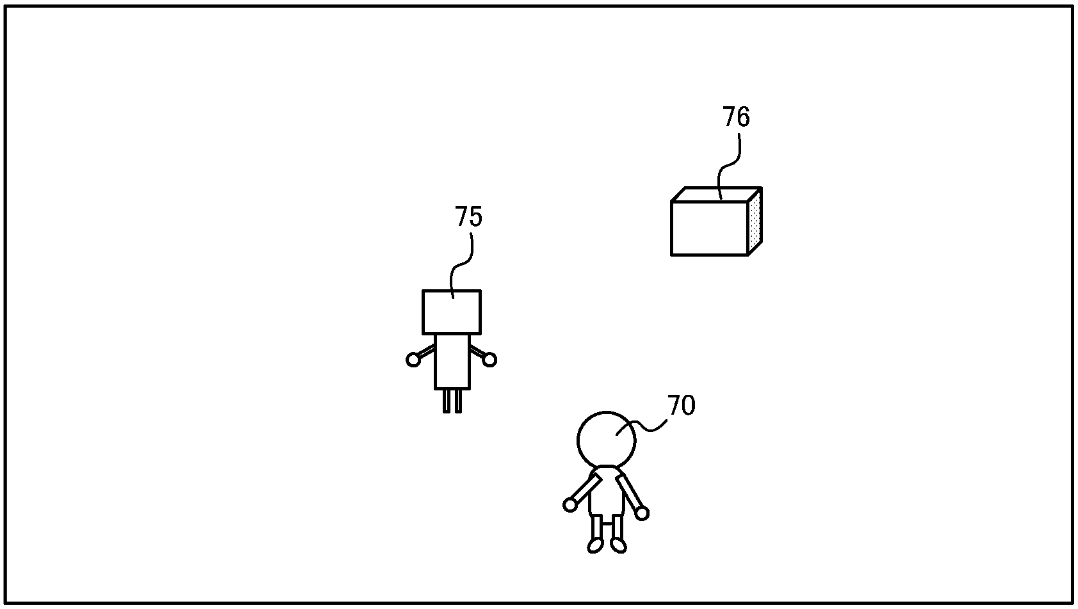
FIG. 5 is an example non-limiting diagram showing an exemplary game image displayed in a case where a game of an exemplary embodiment is executed.

FIG. 5 is a diagram showing an exemplary game image displayed in a situation while a game of this exemplary embodiment is executed. For example, the game of this exemplary embodiment is a role-playing game that progresses while having a player character 70 moving in a virtual space. The player character 70 moves in the virtual space according to user operation (e.g., operation on the analog stick 32 of the left controller 3). The player character 70 causes the game to progress while speaking to another character 75 arranged in the virtual space, or obtaining an item found in the virtual space. Further, the player character 70 encounters an enemy character (not shown) arranged in the virtual space, and fights that enemy character. Additionally, the player character 70 may enter a specific place 76 arranged in the virtual space and purchase an item to be used in the game (e.g., a weapon or armor used to fight an enemy character, food or items to recover the stamina) When the player character 70 purchases an item, for example, the player character 70 consumes in-game currency, points, or the like collected in the game.

Figure 6:
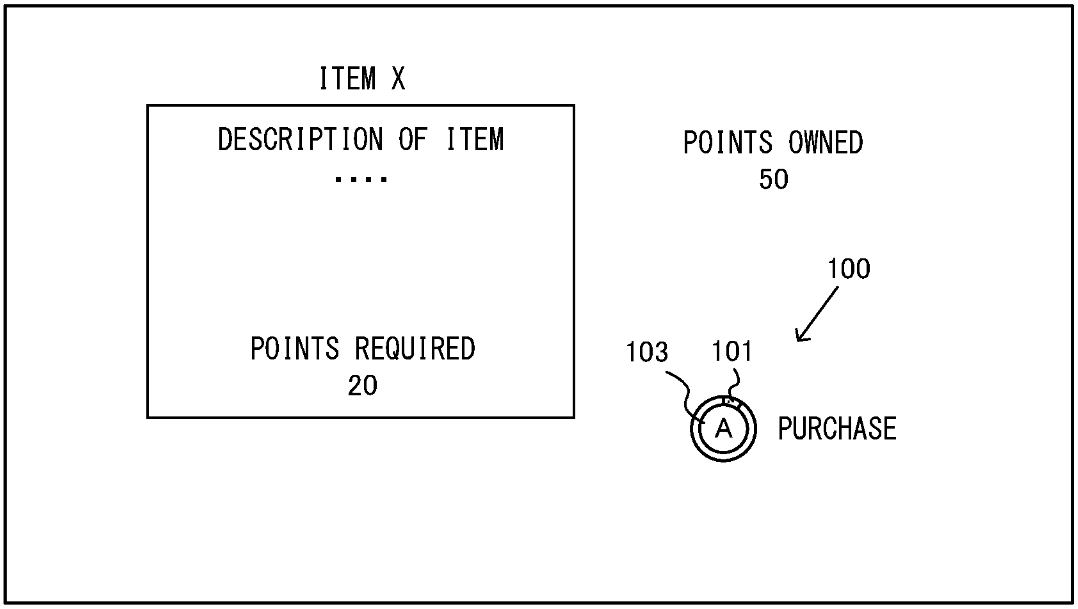
FIG. 6 is an example non-limiting diagram showing an exemplary game image displayed in a case where a player character 70 purchases an item.

FIG. 6 is a diagram showing an exemplary game image displayed in a case where the player character 70 purchases an item. In a case of purchasing an item X as shown in FIG. 6, there are displayed a description of the item X, the number of points needed to purchase the item X ("20" in the figure), the number of points currently owned by the player character 70 ("50" in the figure), and the user interface (hereinafter, "UI") image 100. The UI image 100 is an image for providing the user with guidance about operation, and indicates what operation the user should perform prior to execution of processing associated with the operation (purchasing the item X in this case).

Specifically, the UI image 100 includes a circular key icon image 103. The key icon image 103 is an icon image indicating a button type that should be operated by the user, and displays therein a character indicating the button type that should be operated by the user. In FIG. 6, the key icon image 103 displays therein a character "A", and therefore, the button type that should be operated by the user is "A-button 53". Further, while the A-button 53 is not operated (non-pressed state), a first gauge image 101 is displayed in the UI image 100. The first gauge image 101 in the UI image 100 changes during the non-pressed state.

Figure 7:
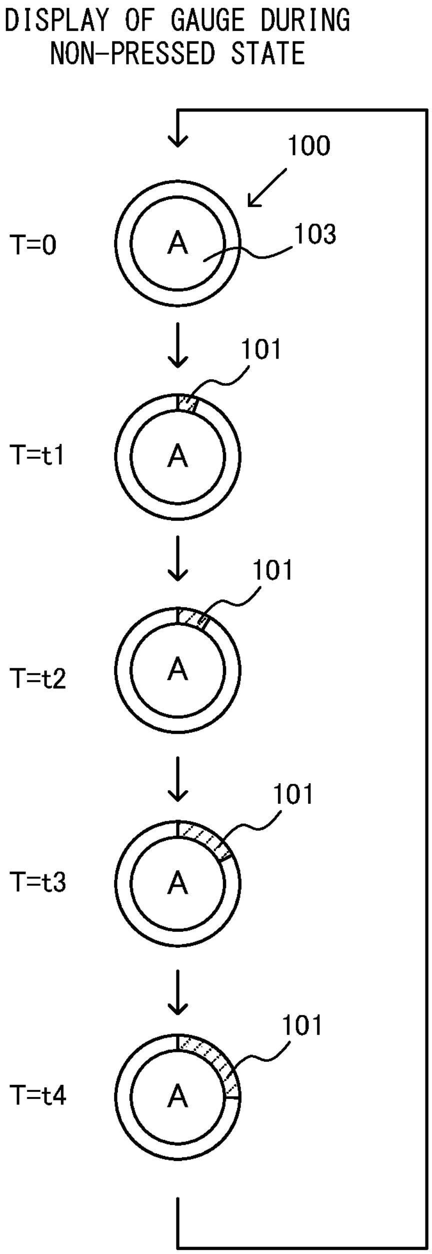
FIG. 7 is an example non-limiting diagram for explaining a UI image 100 in detail, and shows an example change of a first gauge image 101 while an A-button is in a non-pressed state.

FIG. 7 is a diagram for explaining the UI image 100 in detail, and shows exemplary changes in the first gauge image 101 while the A-button is in the non-pressed state.

As shown in FIG. 7, the first gauge image 101 is displayed around the key icon image 103, while the A-button 53 is not pressed. The first gauge image 101 is an image that extends in a predetermined direction. The first gauge image 101 is an image constituting part of a circle, and may be displayed on the inside of the circumference of the key icon image 103, or may be displayed on the outside of the circumference. The first gauge image 101 changes in length with elapse of time. Specifically, the first gauge image 101 extending to a first length with elapse of time is repetitively displayed while the A-button 53 is not pressed. The "T" in FIG. 7 indicates the time elapsed from the point when the length of the first gauge image 101 is "0". The "T" may be expressed as a time or as a number of frames. As shown in FIG. 7, the first gauge image 101 extends with elapse of time (T=t1 to t3) while the A-button 53 is not pressed, and reaches the first length that is the maximum value at T=t4. For example, the first length may be about ¼ of the length of the circumference of the key icon image 103. For example, the time taken for the length of the first gauge image 101 to extend from "0" to "first length" may be 0.1 to 1 second. When the length of the first gauge image 101 reaches the first length, it returns to its initial length (e.g., to the length of "0" that is an initial state). Then, the first gauge image 101 again extends to the first length with elapse of time, while the A-button 53 is not pressed. As described, the first gauge image 101 extending to a first length is repetitively displayed while the A-button 53 is not pressed.

Next, the following describes the UI image 100 displayed while the A-button 53 is pressed. While the A-button 53 is pressed, a second gauge image 102 extending is displayed in the UI image 100.

Figure 8:
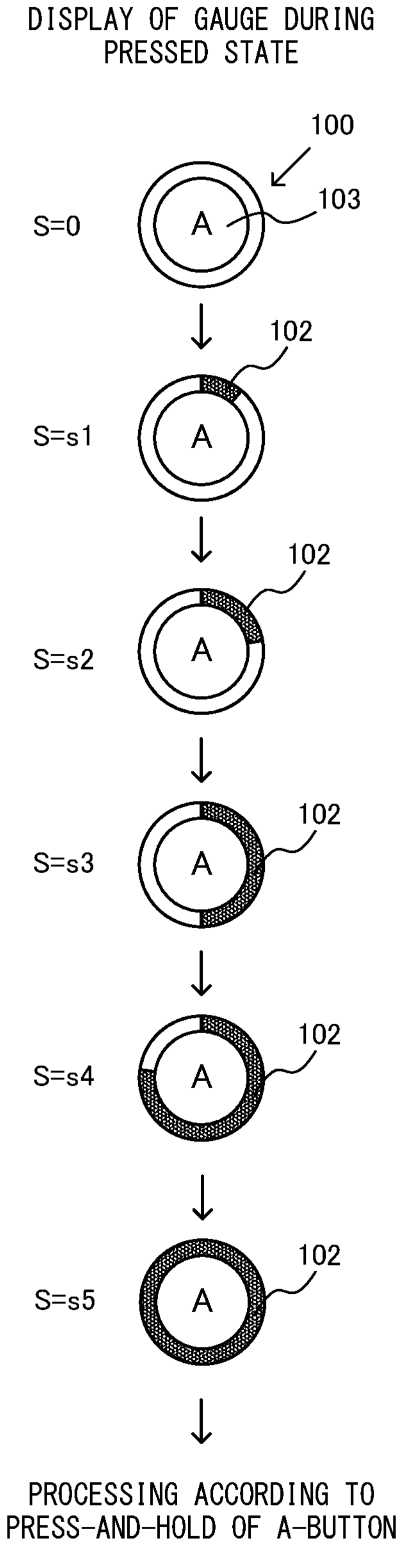
FIG. 8 is an example non-limiting diagram for explaining the UI image 100 in detail, and shows an example change of a second gauge image 102 while an A-button is in a pressed state.

FIG. 8 is a diagram for explaining the UI image 100 in detail, and shows exemplary changes in the second gauge image 102 while the A-button is in the pressed state.

As shown in FIG. 8, the second gauge image 102 is displayed around the key icon image 103, while the A-button 53 is pressed. The second gauge image 102 is an image that extends in a predetermined direction. The second gauge image 102 is an image constituting part of a circle, and is displayed in the same position as the first gauge image 101. The second gauge image 102 changes in length with elapse of time. Note that the second gauge image 102 may be an image having a different color than that of the first gauge image 101. Further, the second gauge image 102 may be an image having the same color as that of the first gauge image 101.

Specifically, the length of the second gauge image 102 extends to a second length with elapse of time while the A-button 53 is pressed and held down. In FIG. 8, the "S" indicates the time elapsed from the point when the length of the second gauge image 102 is "0". The "S" may be expressed as a time or as a number of frames. As shown in FIG. 8, the second gauge image 102 extends with elapse of time while the A-button 53 is pressed, and reaches the second length that is the maximum value at S=s5. The second length may be longer than the first length, and may be, for example, a length about the circumference of the key icon image 103.

The speed at which the second gauge image 102 extends is faster than the speed at which the first gauge image 101 extends. Further, the time taken for the length of the second gauge image 102 extending from "0" to the "second length" (the time from 0 to s5) is shorter than the time taken for the length of the first gauge image 101 extending from "0" to the "first length" (the time from 0 to t4). Note that the speed at which the second gauge image 102 extends may be slower than or the same as the speed at which the first gauge image 101 extends. Further, the time taken for the length of the second gauge image 102 extending from "0" to the "second length" may be longer than or the same as the time taken for the length of the first gauge image 101 extending from "0" to the "first length".

When the length of the second gauge image 102 reaches the second length (i.e., when the A-button 53 is pressed and held down until the length of the second gauge image 102 reaches the second length), processing associated with press-and-hold operation of the A-button 53 is performed. For example, in a situation shown in FIG. 6, processing of the player character 70 purchasing the item X is performed as the processing associated with the press-and-hold operation of the A-button 53.

Specifically, when the second gauge image 102 reaches the second length, the number of points necessary to purchase the item X is subtracted from the number of points owned by the player character 70 as the processing associated with the press-and-hold operation of the A-button 53. Further, an effect of the item X is applied to the player character 70 in the processing associated with the press-and-hold operation of the A-button 53. For example, the item X is added to the items owned by the player character 70. Alternatively, the item X may recover the stamina of the player character 70 or improve a specific ability of the player character 70.

Note that when the pressing of the A-button 53 is ended before the second gauge image 102 reaches the second length, the processing associated with the press-and-hold operation of the A-button 53 is not performed. In this case, the display returns to the non-pressed state of the A-button 53, as illustrated in FIG. 7.

The UI image 100 may be displayed in another situation of the game where the user is assumed to perform the press-and-hold operation. For example, the UI image 100 may be displayed in a situation where the player character 70 obtains an item or an ability by consuming a stamina value, an ability value, an experience value of the player character 70, the points or the in-game currency owned, real-world currency, or the like. For example, a plurality of icon images may be displayed, and each of the icon images may be associated with an item, an ability, or the like obtainable. Further, for example, the UI image may be displayed to prompt the user to perform the press-and-hold operation in a situation where the player character 70 talks to a character 75 in the virtual space or in a situation where the player character 70 picks up an item found in the virtual space.

Figure 9:
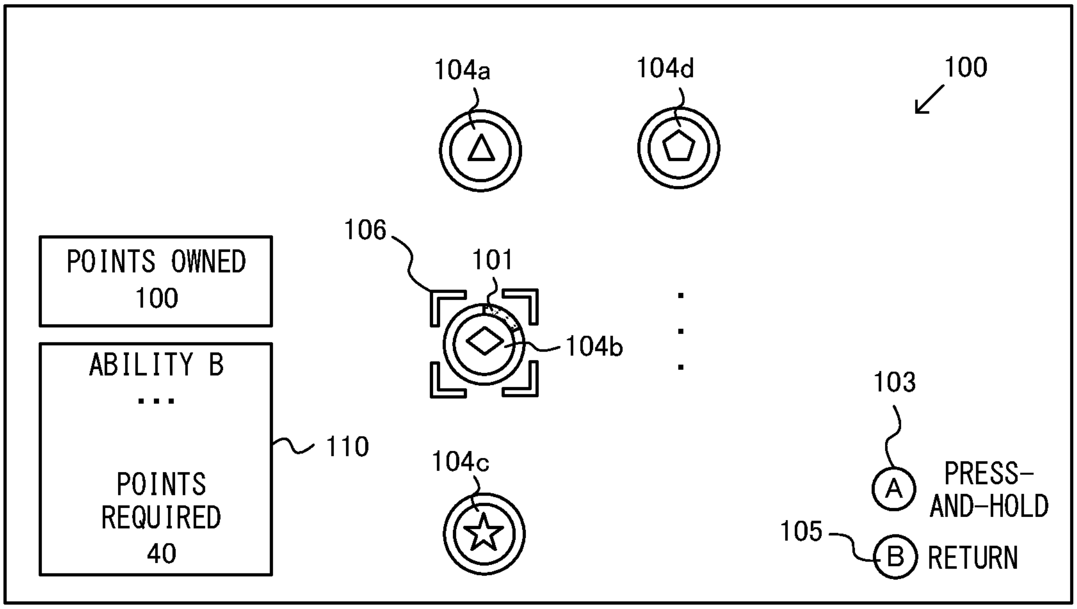
FIG. 9 is an example non-limiting diagram showing the UI image displayed in a different situation, which is an exemplary game image with a plurality of icon images displayed.

FIG. 9 is a diagram showing the UI image displayed in a different situation, which is an exemplary game image with a plurality of icon images displayed.

In the other situation of the game as shown in FIG. 9, the UI image 100 including a plurality of item icon images 104 (104*a* to 104*d*) is displayed. For the item icon images 104, different types of images are displayed, respectively. Each item icon image 104 is associated with different processing. For example, the item icon image 104*a* is associated with processing A. The processing A is processing for causing the player character 70 to obtain or improve an item A or an ability A. Further, the item icon image 104*b* is associated with processing B. The processing B is processing for causing the player character 70 to obtain or improve an item B or an ability B.

Further, the UI image 100 includes a cursor 106 as shown in FIG. 9. The cursor 106 is an image to indicate the item icon image 104 selected. The cursor 106 moves according to the direction input via the analog stick 32 of the left controller 3, for example. The user selects one of the plurality of item icon images 104 by moving the cursor 106.

Further, the UI image 100 also includes the key icon image 103 indicating the type of button to be operated by the user, and a B-button image 105 for returning to the previous screen of the screen shown in FIG. 9. Text reading "press-hold" is displayed on the right side of the key icon image 103, prompting the user to perform press-and-hold operation on the A-button 53 of the right controller 3. Meanwhile, text reading "back" is displayed on the right side of the B-button image 105, indicating that the screen returns when the B-button 54 of the right controller 3 is pressed.

Further, as shown in FIG. 9, an information display area 110 is also provided. For example, while the cursor 106 selects the item icon image 104*b*, the information display area 110 displays information related to processing B associated with the item icon image 104*b*. For example, when the processing B is executed, the player character 70 obtains an ability B. The information display area 110 displays description or an image related to the ability B or the number of points ("40" in the figure) required to obtain the ability B, or the like. While the cursor 106 selects the item icon image 104*a*, the information display area 110 displays information related to processing A associated with the item icon image 104*a*.

While the cursor 106 selects the item icon image 104*b* and while the A-button 53 is not pressed, the first gauge image 101 is displayed around the item icon image 104*b*. As described hereinabove, display of the first gauge image 101 extending to the first length around the item icon image 104*b* selected by the cursor 106 is repeated while the A-button 53 is not pressed. This first gauge image 101 is not displayed around the other item icon images 104 (104*a*, 104*c*, 104*d*) not selected by the cursor 106. While the cursor 106 selects a different item icon image 104 and while the A-button 53 is not pressed, the first gauge image 101 is displayed around that different item icon image 104.

Figure 10:
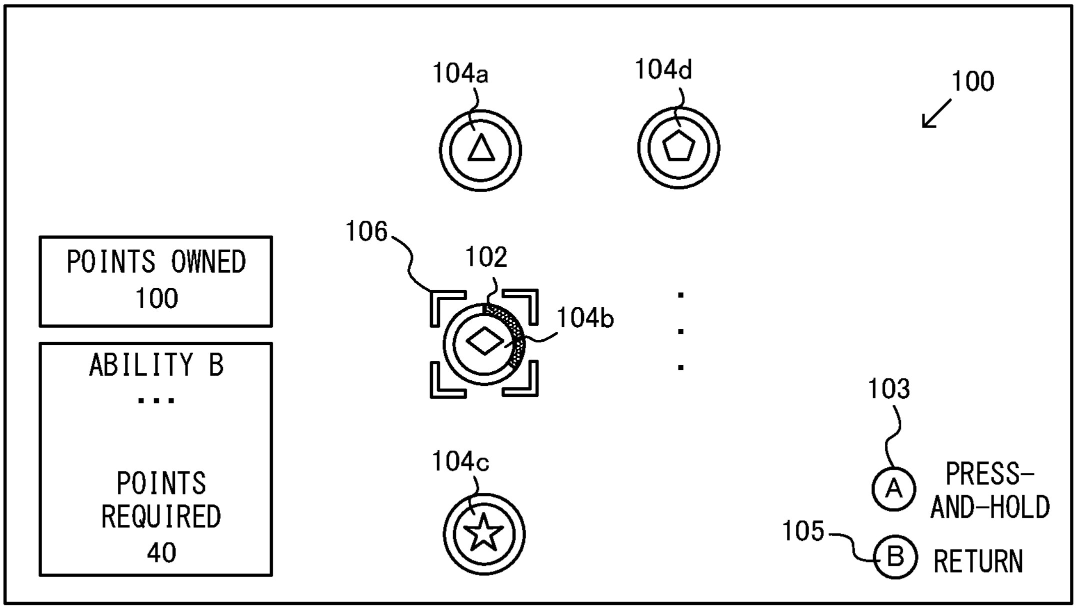
FIG. 10 is an example non-limiting diagram showing an exemplary game image when the A-button 53 is pressed during the state shown in FIG. 9.

While the cursor 106 selects the item icon image 104*b* and while the A-button 53 is pressed, the second gauge image 102 is displayed around the item icon image 104*b*. FIG. 10 is a diagram showing an exemplary game image when the A-button 53 is pressed during the state shown in FIG. 9.

As shown in FIG. 10, while the cursor 106 selects the item icon image 104*b* and while the A-button 53 is pressed and held down, the second gauge image 102 extending around the item icon image 104*b* is displayed. When the second gauge image 102 extends to the second length, the processing B associated with the item icon image 104*b* is executed. For example, in the processing B, the player character 70 consumes points to obtain the ability B.

Although the example shown in FIG. 9 and FIG. 10 displays the first gauge image 101 and the second gauge image 102 around the item icon image 104 selected by the cursor 106, the first gauge image 101 and the second gauge image 102 do not have to be displayed even if the item icon image 104 is selected by the cursor 106, when the processing associated with the icon is not executable for reasons of the points owned falling short, conditions failing to meet the assumption, or the like.

As described, when the user performs continuous operation (press-and-hold operation) to a predetermined button (e.g., A-button) and the press-and-hold operation is continued for a predetermined period of time while the UI image 100 is displayed in a predetermined situation of the game, the processing associated with that operation is executed. Assuming that the user performs such press-and-hold operation, display of the first gauge image 101 extending to the first length is repeated while the predetermined button is not pressed. Repeating the display of the first gauge image 101 extending allows clear indication of the press-and-hold operation on the predetermined button to the user. Further, since the second gauge image 102 extending is displayed while the user continues the press-and-hold operation on the predetermined button, it is possible to have the user continue the press-and-hold operation.

Further, by repeating the display of the first gauge image 101 extending to the first length that is shorter than the second length while the predetermined button is not pressed, it is possible to indicate to the user that the button is not being pressed and prompt the user to operate the button while suggesting press-holding of the button.

Further, by displaying the first gauge image 101 and the second gauge image 102 in the same position of the UI image 100, it is possible to effectively and clearly prompt the user to perform the press-and-hold operation.

Further, using different colors for displaying the first gauge image 101 and the second gauge image 102, respectively, allows the user to clearly understand whether the predetermined button is pressed or not.

Further, since the speed of extending the first gauge image 101 is slower than the speed of extending the second gauge image 102, the user is easily able to notice the display of the first gauge image 101 extending. It is therefore possible to prompt the user to press-hold the predetermined button. Since the speed of the second gauge image 102 extending, while the user presses the predetermined button, is relatively faster, the processing associated with the press-hold of the predetermined button is swiftly executable.

Further, by having the user perform the press-and-hold operation and executing the processing associated with that operation upon the second gauge image 102 reaching the second length, it is possible to avoid an incorrect input by the user. For example, if processing is executed in response to short-pressing of a button (i.e., if processing associated with the button starts immediately upon pressing of that button), the processing associated with the operation is executed even when the user mistakenly presses the button. For example, in a case where the user purchases an item to be used in the game by consuming the points or in-game currency owned by the user or by consuming the real-world currency, the points or the like of the user may decrease against the user's intention if the user mistakenly purchases the item, which may be disadvantageous to the user. Further, in a game-progress affecting situation where the user is to operate a button to determine how the game will progress, operation of an incorrect button by the user causes processing that is against the user's intention, which may be disadvantageous to the user. To avoid such a situation of having processing executed against the user's intention, this exemplary embodiment executes processing when press-and-hold operation is performed to the button associated with the processing, in a specific situation of the game. In such a situation where the user is assumed to perform the press-and-hold operation, the display of the first gauge image 101 extending to the first length is repeated while the button is not pressed, as hereinabove described. This allows the user to easily recognize it is a situation where the user is to perform the press-and-hold operation, while avoiding incorrect input by requiring the press-and-hold operation.

Note that the above UI image 100 is no more than an example, and the UI image 100 may be a different image.

Figure 11:
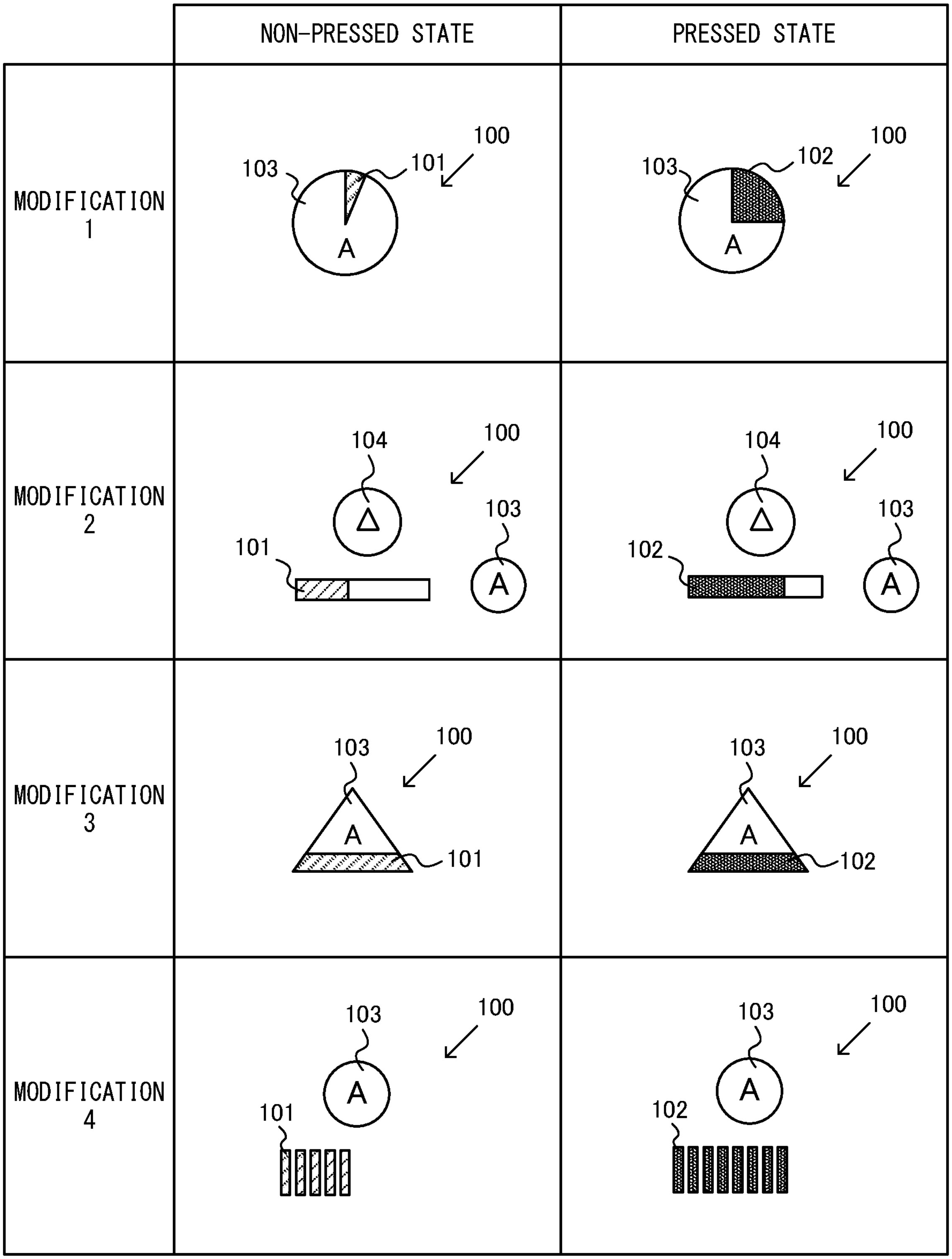
FIG. 11 is an example non-limiting diagram showing an exemplary modification of the UI image.

FIG. 11 is a diagram showing an exemplary modification of the UI image. For example, as shown in Modification 1 in FIG. 11, the gauge image (the first gauge image 101 displayed while the button is in the non-pressed state and the second gauge image 102 displayed while the button is in the pressed state) may be at least a part of a circular image (fan-shaped image) superimposed on the key icon image 103. In this case, too, the first gauge image 101 extends to the first length during the non-pressed state, and the second gauge image 102 extends to the second length during the pressed state. The first gauge image 101 having extended to the first length may be a fan-shape with the center angle being a first angle, and the second gauge image 102 having extended to the second length may be a fan-shape with the center angle being a second angle that is greater than the first angle.

Further, as shown in Modification 2 in FIG. 11, the gauge image may be an image displayed in a position different from those of the key icon image 103 and the item icon image 104. In this case, too, the first gauge image 101 extends to the first length during the non-pressed state, and the second gauge image 102 extends to the second length during the pressed state. Further, although illustration is omitted, an item icon image integrating the key icon image 103 indicating the type of the button to be operated by the user and the item icon image 104 indicating the processing to be executed may be displayed. Further, either the key icon image 103 or the item icon image 104 may be displayed.

Further, as shown in Modification 3 in FIG. 11, the gauge image may be at least a part of, for example, a triangular image, rather than a stripe-shaped image. Further, the gauge image may be any shape and is not limited to a triangular shape. In this case, too, the first gauge image 101 extends to the first length during the non-pressed state, and the second gauge image 102 extends to the second length during the pressed state. The first gauge image 101 having extended to the first length may be a trapezoidal shape with a first height, and the second gauge image 102 having extended to the second length may be a trapezoidal or triangular shape with a second height that is greater than the first height.

Further, as shown in Modification 4 in FIG. 11, the gauge image may be an image that extends intermittently in a predetermined direction, rather than an image extending continuously in the predetermined direction. In this case, too, the first gauge image 101 extends to the first length during the non-pressed state, and the second gauge image 102 extends to the second length during the pressed state.

A gauge image of any given shape other than those shown in FIG. 11 may be displayed. Further, the shapes of the key icon image and the item icon image may be any given shape.

(Processing Details)

Figure 12:
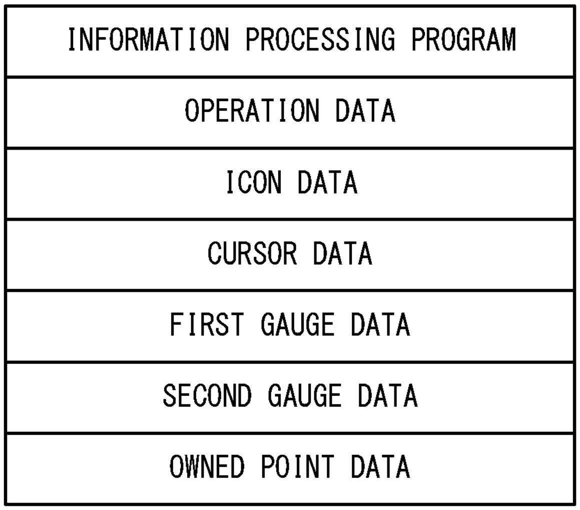
FIG. 12 is an example non-limiting diagram showing exemplary data stored in a memory (mainly in DRAM 85) of the main body apparatus 2.

Next, the following specifically describes exemplary processing related to the above-described UI performed in the main body apparatus 2. First, the following describes data stored in the main body apparatus 2, in a situation where the above-described UI is displayed. As shown in FIG. 9, the following description assumes a situation in which a plurality of item icon images 104 are displayed. FIG. 12 is a diagram showing exemplary data stored in a memory (mainly DRAM 85) of the main body apparatus 2. As shown in FIG. 12, the memory of the main body apparatus 2 stores an information processing program, operation data, item icon data, cursor data, first gauge data, second gauge data, and owned point data. Various other sets of data related to the player character, the items, and the like arranged in the virtual space are also stored in addition to these sets of data.

The information processing program is a program for displaying the above-described UI image, and is a game program for executing the game of this exemplary embodiment. The information processing program is stored, for example, in an external storage medium and is read into the DRAM 85 from the external storage medium at a time of transition to the situation in which the UI image is to be displayed.

The operation data is data based on an operation input of the player transmitted to the main body apparatus 2 via the controller (the left controller 3 and the right controller 4). The operation data includes data related to the pressed state of each button, data related to a direction input via the analog sticks 32 and 52, and the like. The operation data is transmitted from the controller to the main body apparatus 2 at predetermined time intervals (for example, at intervals of 1/200 second).

The item icon data includes data indicating each of the item icon images (104_a_ to 104_d_). Each item icon image 104 is associated with processing to be executed when the press-and-hold operation is completed (i.e., when the second gauge image 102 extends to the second length). Meanwhile, information corresponding to each item icon image 104 (description related to the item and the ability displayed in the information display area 110, an image indicating the item and the ability, information related to the number of points required, and the like) is stored as the item icon data.

The cursor data is data related to the cursor 106. The cursor data includes information related to the position of the cursor 106, information related to the item icon image 104 selected by the cursor 106, and the like.

The first gauge data is information related to the first gauge image 101. The first gauge data includes data indicating whether or not the first gauge image 101 is displayed and data related to the length of the first gauge image 101 (data related to the value of the parameter "T").

The second gauge data is information related to the second gauge image 102. The second gauge data includes data indicating whether or not the second gauge image 102 is displayed and data related to the length of the second gauge image 102 (data related to the value of the parameter "S").

The owned point data is data related to the points owned by the player character 70. The player character 70 is able to obtain and store points while the game is executed. For example, the player character 70 may obtain points through a battle against an enemy character, by obtaining an object found in the virtual space, or the like. The points owned by the player character 70 are consumed at a time of obtaining an item, an ability, and the like, as hereinabove described.

In addition to the above-described sets of data, the memory stores data related to the in-game currency owned by the player character 70, and the like.

(UI Processing Flowchart)

Figure 13:
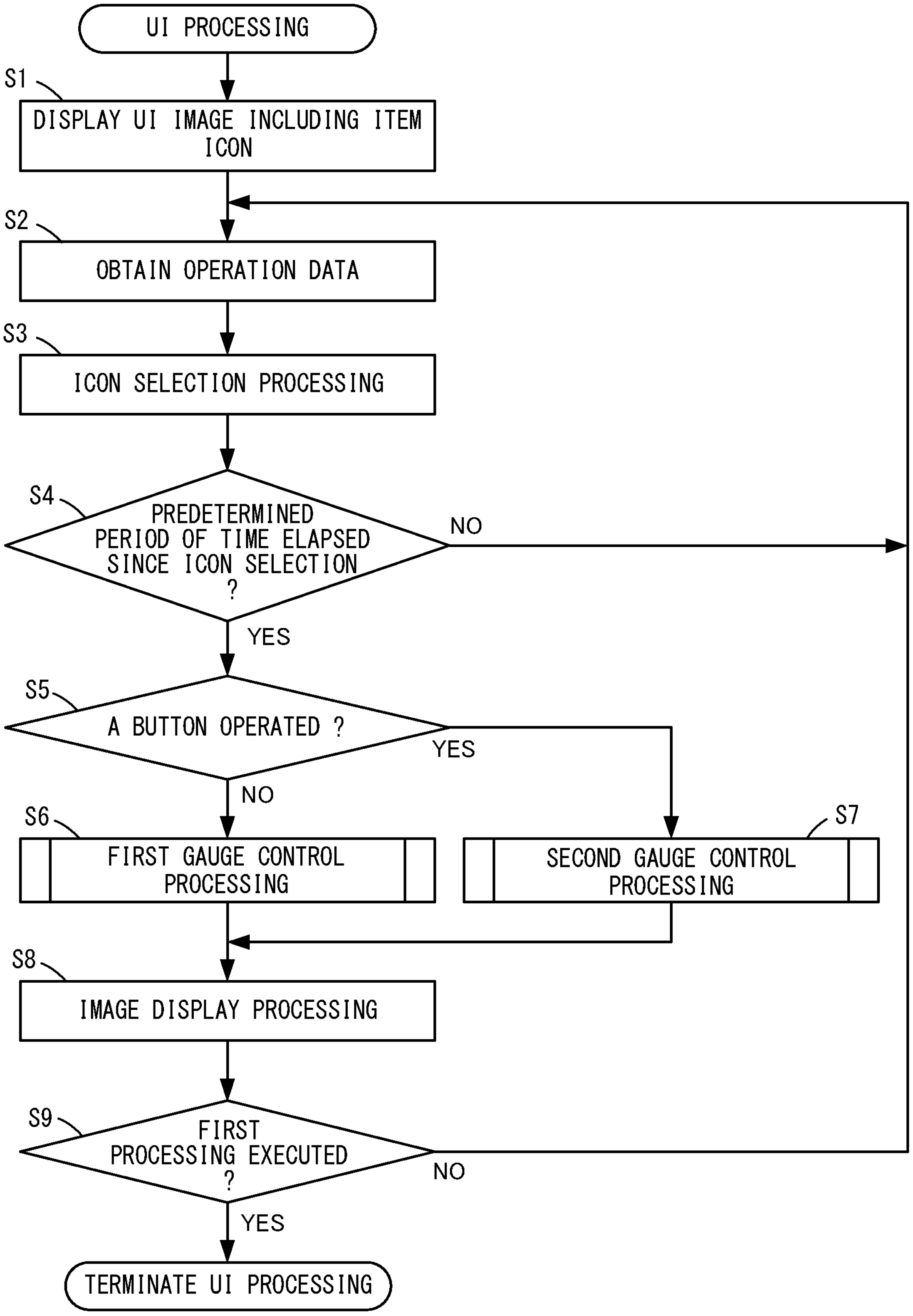
FIG. 13 is an example non-limiting flowchart showing exemplary UI processing executed by a processor 81 of the main body apparatus 2.

Next, the following details the UI processing related to the UI displayed in a specific situation of the game, according to this exemplary embodiment. FIG. 13 is a flowchart showing exemplary UI processing executed by the processor 81 of the main body apparatus 2. Note that the UI processing illustrated in FIG. 13 is executed when a transition occurs to the situation where the UI is displayed during the execution of the game processing. As shown in FIG. 9, the following description assumes that there has been a transition to the situation where a plurality of item icon images 104 are displayed. For example, the transition to the situation as shown in FIG. 9 may occur when the player character 70 enters a specific location in the virtual space.

As shown in FIG. 13, the processor 81 first displays the UI image 100 including a plurality of item icon images (step S1). In this step, the UI image 100 including the plurality of item icon images 104_a_ to 104_d_ as shown in FIG. 9 is displayed. Further, the cursor 106 is displayed at an initial position. Further, the key icon image 103 and the B-button image 105 are shown in a lower right area of the screen. Further, the information display area 110 is displayed in the lower left of the screen.

After step S1, the processor 81 executes step S2. After this, the processor 81 repeats the processing from step S2 to step S9 at every predetermined frame time (e.g., 1/60 seconds).

In step S2, the processor 81 retrieves operation data from the controllers 3 and 4.

Next, in step S3, the processor 81 performs icon selection processing based on the operation data. Specifically, for example, the processor 81 moves the cursor 106 in the direction corresponding to the direction input via the analog stick 32, which input is included in the operation data, and changes the selected item icon image to the item icon image 104 where the cursor 106 is positioned after the movement. In the absence of the direction input using the analog stick 32, the cursor 106 does not move and the selected item icon image 104 does not change.

Next, in step S4, the processor 81 determines whether a predetermined period of time has elapsed since the time the item icon image 104 is selected. In this step, whether or not a predetermined period of time has elapsed since the time of selecting the item icon image 104 with the cursor 106 is determined. If step S4 results in YES, the processor 81 proceeds to step S5. If step S4 results in NO, the processor 81 returns the processing to step S2. For example, step S4 results in NO for several frame time to several tens of frame time after the cursor 106 moves to the current position, and step S4 results in YES after the several frame time to several tens of frame time has elapsed.

In step S5, the processor 81 determines whether the A-button 53 is pressed based on the operation data. If step S5 results in NO, the processor 81 proceeds to step S6. If step S5 results in YES, the processor 81 proceeds to step S7.

Figure 14:
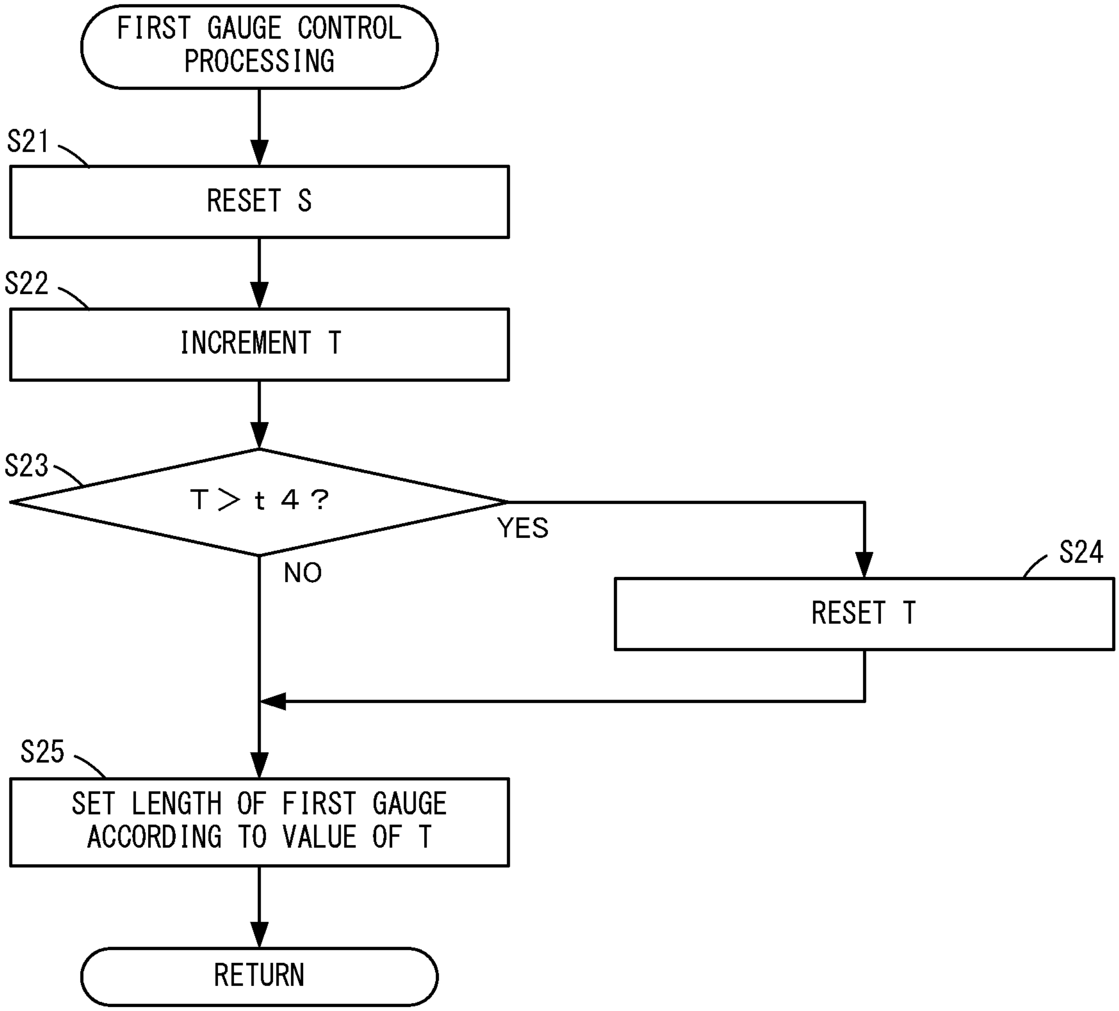
FIG. 14 is an example non-limiting flowchart showing exemplary first gauge control processing in step S6.

In step S6, the processor 81 executes first gauge control processing. The first gauge control processing is processing for controlling the display of the first gauge image 101. With reference to FIG. 14, this first gauge control processing of step S6 will be detailed.

FIG. 14 is a flowchart showing exemplary first gauge control processing of step S6.

In step S21, the processor 81 resets the "S". The "S" is a parameter related to the length of the second gauge image 102. Specifically, for example, the "S" is a value that increases while the A-button 53 is pressed and is a value indicating the time elapsed from the start of pressing the A-button 53 (that is, the start of displaying the second gauge image 102). In step S21, the A-button 53 is not pressed, and the "S" is therefore set to "0".

Next, in step S22, the processor 81 increments the "T". The "T" is a parameter related to the length of the first gauge image 101. Specifically, for example, the "T" is a value that increases while the A-button 53 is not pressed (i.e., while the first gauge image 101 is displayed) and is a value indicating the time elapsed from the time the length of the first gauge image 101 becomes "0".

Next, in step S23, the processor 81 determines whether the "T" is greater than t4 which is determined in advance. The "t4" is a value when the first gauge image 101 reaches the first length (see FIG. 7). If step S23 results in YES, the processor 81 proceeds to step S24. If step S23 results in NO, the processor 81 proceeds to step S25.

In step S24, the processor 81 resets the "T". As a result, the T is set to 0. Next, the processor 81 executes step S25.

In step S25, the processor 81 sets the length of the first gauge image 101 according to the value of the T. When step S25 is executed, the processor 81 ends the first gauge control processing shown in FIG. 14 and returns the processing to FIG. 13.

As described, the T is incremented every frame in step S22 while the A-button 53 is not pressed. By setting the length of the first gauge image 101 according to the value of the T in step S25, the first gauge image 101 extends according to the time having elapsed. If the "T" is greater than "t4", the T is reset in step S24. As a result, the length of the first gauge image 101 returns to the initial length (e.g., length of "0") upon reaching the first length. Then, the T is, again, incremented according to the time elapsed and the first gauge image 101 extends.

Figure 15:
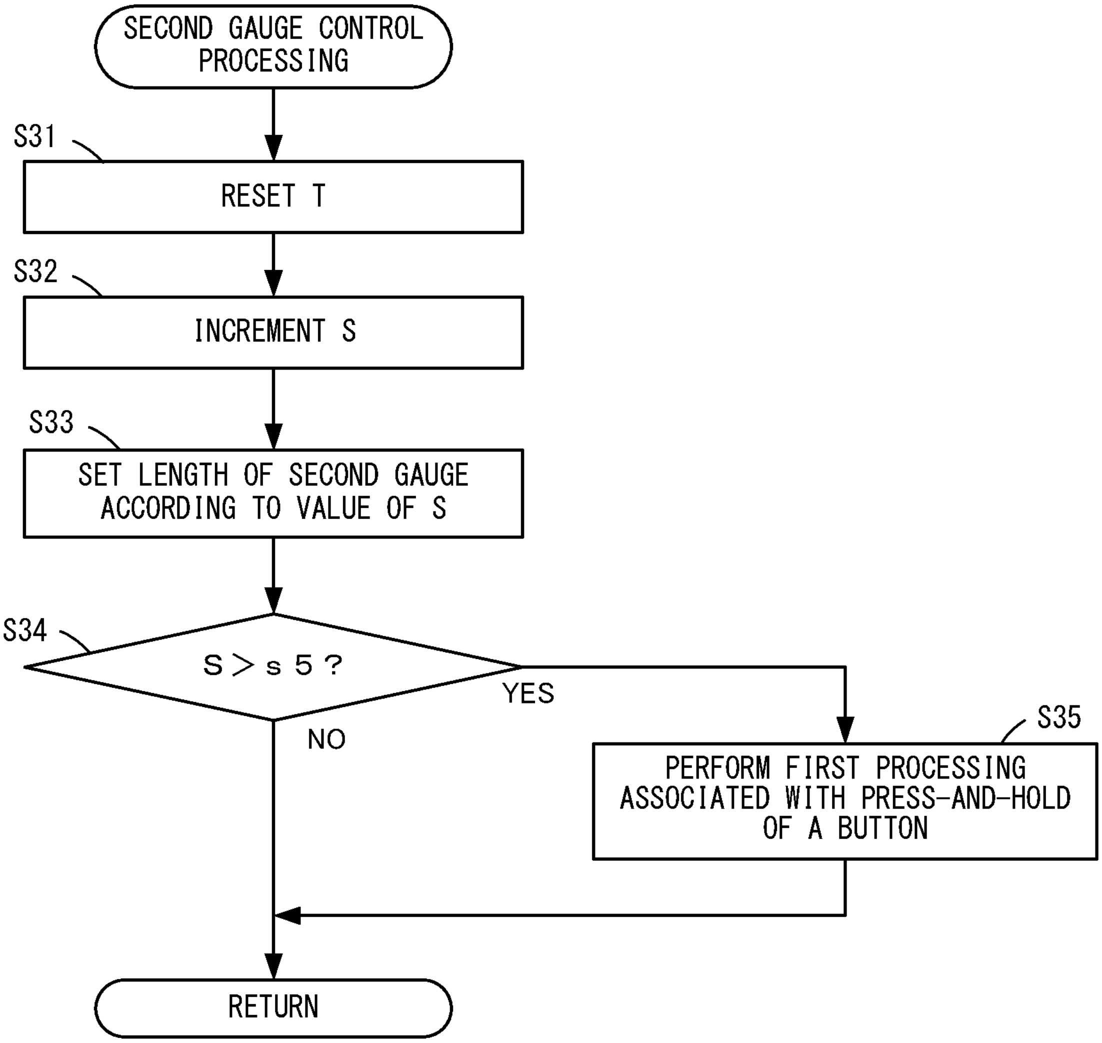
FIG. 15 is an example non-limiting flowchart showing exemplary second gauge control processing in step S7.

Referring to FIG. 13 again, in step S7, the processor 81 executes second gauge control processing. The second gauge control processing is processing for controlling the display of the second gauge image 102. With reference to FIG. 15, this second gauge control processing of step S7 will be detailed.

FIG. 15 is a flowchart showing exemplary second gauge control processing of step S7.

In step S31, the processor 81 resets the "T".

Next, in step S32, the processor 81 increments the "S".

In the subsequent step S33, the processor 81 sets the length of the second gauge image 102 according to the value of the S.

Next, in step S34, the processor 81 determines whether the "S" is greater than s5 which is determined in advance. The "s5" is a value when the second gauge image 102 reaches the second length (see FIG. 8). If step S34 results in YES, the processor 81 proceeds to step S35. If step S34 results in NO, the processor 81 ends the second gauge control processing of FIG. 15 and returns to the processing of FIG. 13.

In step S35, the processor 81 executes first processing associated with the press-and-hold operation of the A-button 53. Specifically, the processor 81 executes the first processing corresponding to the item icon image 104 selected by the cursor 106. For example, when processing of purchasing a specific item is executed as the first processing, the processor 81 subtracts the number of points necessary to purchase that item from the points owned, and adds the item to the items owned by the player character 70. Further, when processing of having the player character 70 obtain a specific ability is executed as the first processing, the processor 81 subtracts the number of points necessary to obtain that ability from the points owned, and adds the specific ability to the player character 70. Further, the value of the "S" is reset in the first processing. When step S35 is executed, the processor 81 ends the second gauge control processing shown in FIG. 15 and returns the processing to FIG. 13.

As described, the S is incremented every frame in step S32 while the A-button 53 is pressed. By setting the length of the second gauge image 102 according to the value of the S in step S33, the second gauge image 102 extends according to the time in which pressing of the A-button 53 continues. When the "S" is greater than "s5", processing associated with the press-and-hold operation of the A-button 53 is executed in step S35. As a result, the processing associated with the press-and-hold operation of the A-button 53 is executed when the second gauge image 102 extends to the second length.

Referring to FIG. 13 again, the processor 81 executes step S8 when step S6 or step S7 is executed.

In step S8, the processor 81 executes image display processing. In this step, a UI image including a gauge image is generated and a game image including the UI image is displayed on a display device. For example, while the A-button 53 is not pressed, the length of the first gauge image 101 is set in step S6, and the UI image 100 including the first gauge image 101 is displayed. As a result, the game image as shown in FIG. 9 is displayed. Further, while the A-button 53 is pressed, the length of the second gauge image 102 is set in step S7, and the UI image 100 including the second gauge image 102 is displayed. As a result, the game image as shown in FIG. 10 is displayed.

Next, in step S9, the processor 81 determines whether the first processing has been executed in step S35. When it is determined that the first processing has been executed, the processor 81 terminates the UI processing shown in FIG. 13. When it is determined that the first processing has not been executed, the processor 81 returns the processing to step S2.

Note that the above-described flowchart is no more than an example, and each step may be changed, another step may be added, or some of the steps may be omitted, or the sequence of the steps may be changed.

As described hereinabove, in this exemplary embodiment, display of the first gauge image 101 extending to the first length is repeated while a predetermined button (e.g., the A-button 53) is not being operated (step S25). During continued operation on the predetermined button, the second gauge image 102 extending is displayed (step S33), and when the second gauge image 102 reaches the second length, the first processing associated with that operation is performed (step S35). Thus, in a case where the first processing is performed when the user performs continuous operation on the predetermined button, that continuous operation on the predetermined button can be clearly indicated to the user.

(Modification)

An exemplary embodiment of the UI processing is thus described hereinabove. It should be noted that the above-described exemplary embodiment is no more than an example, and various modifications as described below are possible.

For example, the above-described exemplary embodiment deals with a case where the first gauge image 101 extends to the first length, the second gauge image 102 extends to the second length, and the first length is shorter than the second length. In another exemplary embodiment, the first length and the second length may be the same. In this case, for example, the first gauge image 101 may extend along the entire circumference of the circle similarly to the second gauge image 102. Further, in another exemplary embodiment, the first length may be longer than the second length.

Further, in the above-described exemplary embodiment, the first gauge image 101 and the second gauge image 102 are displayed at the same position. In another exemplary embodiment, the first gauge image 101 and the second gauge image 102 may be displayed at different positions.

Further, in the above-described exemplary embodiment, the first gauge image 101 and the second gauge image 102 have the same color or different colors. In another exemplary embodiment, the first gauge image 101 and the second gauge image 102 may have the same color with different patterns, or the same pattern with different colors. Further, the first gauge image 101 and the second gauge image 102 may have the same color and pattern. Further, the first gauge image 101 and the second gauge image 102 may have the different colors and patterns.

The shapes of the above-described key icon image 103 and the item icon image 104 are no more than examples, and may be any other shapes.

Further, the UI image 100 may include the gauge image (a first gauge image 101 or a second gauge image 102) and the key icon image 103, but no item icon image 104. Further, the UI image 100 may include the gauge image and the item icon image 104, but no key icon image 103.

In the above-described exemplary embodiment, the cursor 106 is displayed when a plurality of item icon images 104 are displayed, but the cursor 106 may not be displayed even when a plurality of item icon images 104 are displayed. In this case, one of the plurality of item icon images 104 may be internally selected, and the selected item icon image may be indicated by showing the first gauge image or the second gauge image around the selected item icon image.

Further, the cursor 106 may be displayed even when only one item icon image 104 is displayed, or when only one key icon image 103 is displayed.

Further, for each of the plurality of keys (the buttons of the controllers 3 and 4, the analog stick, and the like), a plurality of key icon images may be displayed. Of the plurality of key icon images, the gauge image may be displayed around the key icon image selected.

Further, the above-described embodiment deals with a case where the first gauge image 101 prompting the press-and-hold operation is displayed, assuming that the user is to perform the press-and-hold operation in a specific situation of a role-playing game. In another exemplary embodiment, the first gauge image 101 prompting the press-and-hold operation may be displayed, assuming that the user is to perform the press-and-hold operation in a specific situation of not only in the role-playing game but also in any given game.

The above-described UI image including the gauge image may be displayed not only in the situation described hereinabove, but also in other situations. For example, in a situation of having the user to select whether to skip a predetermined event, the event may be skipped when the press-and-hold operation on a predetermined button is performed. In such a situation, display of the first gauge image extending to the first length is repeated while the predetermined button is not pressed, and the second gauge image extending is displayed while the predetermined button is pressed. When the second gauge image extends to the second length, the game may progress with processing of skipping (omitting) the predetermined event as the first processing.

Further, in the above-described exemplary embodiment, when a period of the continuous operation on the predetermined button reaches a predetermined period of time, the first processing associated with that operation is performed. In other words, whether to perform the first processing is determined based on the amount of time that has elapsed since the beginning of operation on the predetermined button. In another exemplary embodiment, whether to perform the first processing may be determined based on whether or not the second gauge image has become the second length. In other words, whether to perform the first processing may be determined based on the length of the second gauge image.

Further, the above-described exemplary embodiment deals with a case where the second gauge image extends while the predetermined button is operated, and the length of the second gauge image is set to "0" when the predetermined button is no longer operated. In another exemplary embodiment, the second gauge image may be shortened when the predetermined button is no longer operated. In this case, if the operation of the predetermined button is resumed while the length of the second gauge image is shortened, the second gauge image may extend from the length at that time point.

Further, the UI image may be displayed not only in a case of prompting operation on a button, but also in a case of prompting the user to perform continuous operation on another operation section. For example, a continuous touch operation may be performed on the touch panel as the continuous operation of the other operation section. For example, with an assumption that the first processing associated with touch operation is performed when the touch panel is touched for a predetermined amount of time, display of the first gauge image extending to the first length may be repeated while the touch panel is not touched. While the touch panel is continuously touched, the second gauge image extending may be displayed, and the first processing may be performed when the second gauge image extends to the second length. The continuous touch operation is not limited to the continuous touch operation at the same position, and also encompasses a case where the user is assumed to perform continuous touch operation while changing the touching position, the first gauge image may be displayed while the user is not performing the touching operation and the second gauge image may be displayed while the user is performing the touch operation. Further, the above-described gauge image may be displayed in a case where the user is assumed to perform continuous operation on the analog stick.

Further, the above-described exemplary embodiment deals with a case where the UI image including the above-described gauge image is displayed while the press-and-hold operation is performed on the operating device. The second gauge image extending may be displayed when a first operation is performed continuously on the operating device. The continuous first operation is not limited to press-and-hold operation of keep pressing the button, and may be, for example, consecutive short presses of the button within a predetermined period of time. Assuming that such operation is to be prompted, display of the first gauge image extending to the first length may be repeated while the first operation is not continuously performed (e.g., while the button is not pressed or in a case where the button is intermittently pressed, but not consecutively pressed within a predetermined period of time). Further, the second gauge image extending is displayed while the first operation is continuously performed (e.g., consecutive short presses of the button is performed within a predetermined period of time), and the first processing associated with the first operation is performed when the second gauge image reaches the second length.

Further, the UI image including the above-described gauge image may be displayed not only in a game but also in a specific situation of any given information processing. The UI image including the above-described gauge image may be displayed in a situation that prompts the user to perform any decision-making operation (e.g., placing a purchasing order, operation of determining to execute an application program).

Further, the above-described UI processing may be executed not only in a game system 1, but also in any given information processing apparatus or an information processing system including a processor. For example, the UI processing may be executed in any gaming apparatus, personal computer, smartphone, mobile phone, tablet terminal, server, or the like. The information processing system may be configured by a plurality of apparatuses, and the above-described processing may be partially or entirely executed by any one or more apparatuses configuring the information processing system. The plurality of apparatuses may be connected via a network (e.g., a LAN, the Internet, or the like). For example, the server may perform at least part of the above-described UI processing, and the UI image resulting from the processing may be transmitted to a user terminal and displayed on the user terminal.

The configurations of the above exemplary embodiment and its modifications can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing an information processing program that causes at least one processor to:

obtain operation data from an operating device;

determine whether or not first operation is performed on the operating device, based on the operation data;

display an image including a predetermined UI image on a display device, in a first situation of information processing;

repeat display of a first gauge extending to a first length with elapse of time in a part of the UI image, while the first operation is not performed in the first situation;

display a second gauge extending with elapse of time in a part of the UI image, while the first operation is continuously performed in the first situation; and in response to the second gauge reaching a second length due to the first operation being continuously performed, perform first processing corresponding to the first operation.

2. The non-transitory computer-readable storage medium storing the information processing program of claim 1, wherein the first length is shorter than the second length.

3. The non-transitory computer-readable storage medium storing the information processing program of claim 2, wherein the first gauge and the second gauge are displayed in a same position of the UI image, and are gauges having different colors, respectively, or gauges having a same color.

4. The non-transitory computer-readable storage medium storing the information processing program of claim 3, wherein the first gauge and the second gauge are each an image constituting at least a part of a circle arranged around a circular icon that is a part of the UI image.

5. The non-transitory computer-readable storage medium storing the information processing program of claim 4, wherein:

the first operation is operation of pressing a predetermined key provided in the operating device; and the circular icon is a key icon indicating a type of the key.

6. The non-transitory computer-readable storage medium storing the information processing program of claim 1, the program causes the at least one processor to:

display, in the first situation, a plurality of item icons related to a plurality of items and a cursor that indicates a selected item out of the plurality of items, the first situation being a situation of selecting any of the plurality of items;

control the cursor to change the selected item icon, based on a second operation on the operating device;

display the first gauge and the second gauge around the selected item icon; and perform processing associated with the selected item as the first processing.

7. The non-transitory computer-readable storage medium storing the information processing program of claim 6, wherein:

the first operation is operation of pressing a predetermined key provided in the operating device; and the UI image includes a key icon indicating a type of the key.

8. The non-transitory computer-readable storage medium storing the information processing program of claim 1, wherein a speed at which the first gauge extends is slower than a speed at which the second gauge extends.

9. An information processing apparatus comprising at least one processor, the at least one processor being configured to:

obtain operation data from an operating device;

determine whether or not first operation is performed on the operating device, based on the operation data;

display an image including a predetermined UI image on a display device, in a first situation of information processing;

repeat display of a first gauge extending to a first length with elapse of time in a part of the UI image, while the first operation is not performed in the first situation;

display a second gauge extending with elapse of time in a part of the UI image, while the first operation is continuously performed in the first situation; and in response to the second gauge reaching a second length due to the first operation being continuously performed, perform first processing corresponding to the first operation.

10. The information processing apparatus of claim 9, wherein the first length is shorter than the second length.

11. The information processing apparatus of claim 10, wherein the first gauge and the second gauge are displayed in a same position of the UI image, and are gauges having different colors, respectively, or gauges having a same color.

12. The information processing apparatus of claim 11, wherein the first gauge and the second gauge are each an image constituting at least a part of a circle arranged around a circular icon that is a part of the UI image.

13. The information processing apparatus of claim 12, wherein:
the first operation is operation of pressing a predetermined key provided in the operating device; and
the circular icon is a key icon indicating a type of the key.

14. The information processing apparatus of claim 9, wherein the at least one processor is configured to:
display, in the first situation, a plurality of item icons related to a plurality of items and a cursor that indicates a selected item out of the plurality of items, the first situation being a situation of selecting any of the plurality of items;
control the cursor to change the selected item icon, based on a second operation on the operating device;
display the first gauge and the second gauge around the selected item icon; and
perform processing associated with the selected item as the first processing.

15. The information processing apparatus of claim 14, wherein:
the first operation is operation of pressing a predetermined key provided in the operating device; and
the UI image includes a key icon indicating a type of the key.

16. The information processing apparatus of claim 9, wherein a speed at which the first gauge extends is slower than a speed at which the second gauge extends.

17. An information processing system comprising at least one processor, the at least one processor being configured to:
obtain operation data from an operating device;
determine whether or not first operation is performed on the operating device, based on the operation data;
display an image including a predetermined UI image on a display device, in a first situation of information processing;
repeat display of a first gauge extending to a first length with elapse of time in a part of the UI image, while the first operation is not performed in the first situation;
display a second gauge extending with elapse of time in a part of the UI image, while the first operation is continuously performed in the first situation; and
in response to the second gauge reaching a second length due to the first operation being continuously performed, perform first processing corresponding to the first operation.

18. The information processing system of claim 17, wherein the first length is shorter than the second length.

19. The information processing system of claim 18, wherein the first gauge and the second gauge are displayed in a same position of the UI image, and are gauges having different colors, respectively, or gauges having a same color.

20. The information processing system of claim 19, wherein the first gauge and the second gauge are each an image constituting at least a part of a circle arranged around a circular icon that is a part of the UI image.

21. The information processing system of claim 20, wherein:
the first operation is operation of pressing a predetermined key provided in the operating device; and
the circular icon is a key icon indicating a type of the key.

22. The information processing system of claim 17, wherein the at least one processor is configured to:
display, in the first situation, a plurality of item icons related to a plurality of items and a cursor that indicates a selected item out of the plurality of items, the first situation being a situation of selecting any of the plurality of items;
control the cursor to change the selected item icon, based on a second operation on the operating device;
display the first gauge and the second gauge around the selected item icon; and
perform processing associated with the selected item as the first processing.

23. The information processing system of claim 22, wherein:
the first operation is operation of pressing a predetermined key provided in the operating device; and
the UI image includes a key icon indicating a type of the key.

24. The information processing system of claim 17, wherein a speed at which the first gauge extends is slower than a speed at which the second gauge extends.

25. An information processing method executable in an information processing system, the method comprising:
obtaining operation data from an operating device;
determining whether or not first operation is performed on the operating device, based on the operation data;
displaying an image including a predetermined UI image on a display device, in a first situation of information processing;
repeating display of a first gauge extending to a first length with elapse of time in a part of the UI image, while the first operation is not performed in the first situation;
displaying a second gauge extending with elapse of time in a part of the UI image, while the first operation is continuously performed in the first situation; and
in response to the second gauge reaching a second length due to the first operation being continuously performed, performing first processing corresponding to the first operation.

26. The information processing method of claim 25, wherein the first length is shorter than the second length.

27. The information processing method of claim 26, wherein the first gauge and the second gauge are displayed in a same position of the UI image, and are gauges having different colors, respectively, or gauges having a same color.

28. The information processing method of claim 27, wherein the first gauge and the second gauge are each an image constituting at least a part of a circle arranged around a circular icon that is a part of the UI image.

29. The information processing method of claim 28, wherein:
the first operation is operation of pressing a predetermined key provided in the operating device; and
the circular icon is a key icon indicating a type of the key.

30. The information processing method of claim 25, further comprising:
displaying, in the first situation, a plurality of item icons related to a plurality of items and a cursor that indicates a selected item out of the plurality of items, the first situation being a situation of selecting any of the plurality of items;
controlling the cursor to change the selected item icon, based on a second operation on the operating device;
displaying the first gauge and the second gauge around the selected item icon; and
performing processing associated with the selected item as the first processing.

31. The information processing method of claim 30, wherein:

the first operation is operation of pressing a predetermined key provided in the operating device; and the UI image includes a key icon indicating a type of the key.

32. The information processing method of claim 25, wherein a speed at which the first gauge extends is slower than a speed at which the second gauge extends.

* * * * *